United States Patent
McCarthy, Jr.

(10) Patent No.: US 11,148,654 B2
(45) Date of Patent: Oct. 19, 2021

(54) FAST COLD START HEAT UP AND ENERGY EFFICIENCY FOR COMMERCIAL VEHICLE POWERTRAIN

(71) Applicant: Eaton Intelligent Power Limited, Dublin (IE)

(72) Inventor: James E. McCarthy, Jr., Kalamazoo, MI (US)

(*) Notice: Subject to any disclaimer, the term of this patent is extended or adjusted under 35 U.S.C. 154(b) by 43 days.

(21) Appl. No.: 16/561,623

(22) Filed: Sep. 5, 2019

(65) Prior Publication Data
US 2020/0114897 A1    Apr. 16, 2020

Related U.S. Application Data

(63) Continuation of application No. PCT/US2018/021565, filed on Mar. 8, 2018.
(Continued)

(51) Int. Cl.
*B60W 20/16* (2016.01)
*B60W 10/08* (2006.01)
(Continued)

(52) U.S. Cl.
CPC ............ *B60W 10/08* (2013.01); *B60W 20/00* (2013.01); *B60W 20/16* (2016.01); *F02D 17/02* (2013.01);
(Continued)

(58) Field of Classification Search
CPC ...... B60W 10/06; B60W 10/08; B60W 10/11; B60W 20/16; F02D 17/02; F02D 41/0215;
(Continued)

(56) References Cited

U.S. PATENT DOCUMENTS

| 6,742,326 B2 | 6/2004 | Xu et al. |
| 6,945,893 B2 * | 9/2005 | Grillo ............... B60K 6/365 475/5 |

(Continued)

FOREIGN PATENT DOCUMENTS

JP    2015200313 A    11/2015

OTHER PUBLICATIONS

International Search Report and Written Opinion for International Application No. PCT/US2018/021565 dated Jun. 15, 2018.

*Primary Examiner* — Edwin A Young
(74) *Attorney, Agent, or Firm* — RMCK Law Group PLC

(57) ABSTRACT

A transmission system constructed in accordance to one example of the present disclosure includes an aftertreatment system and a controller. The transmission system is selectively coupled to an engine crankshaft of an internal combustion engine arranged on a vehicle. The aftertreatment system reduces emissions in an exhaust of the internal combustion engine. The controller operates in an aftertreatment heat-up mode such that the aftertreatment system is heated up to an elevated temperature and emissions are thereby reduced based on the elevated temperature. The controller operates in the aftertreatment heat-up mode when the internal combustion engine is operating at or below a brake mean effective pressure between three and four bar. The aftertreatment heat-up mode comprises increasing load on the internal combustion engine.

29 Claims, 18 Drawing Sheets

Related U.S. Application Data

(60) Provisional application No. 62/468,434, filed on Mar. 8, 2017, provisional application No. 62/500,265, filed on May 2, 2017, provisional application No. 62/567,403, filed on Oct. 3, 2017.

(51) Int. Cl.
| | |
|---|---|
| *B60W 20/00* | (2016.01) |
| *F02D 41/02* | (2006.01) |
| *F02D 17/02* | (2006.01) |
| *B60K 6/365* | (2007.10) |
| *B60W 10/06* | (2006.01) |
| *F02N 11/04* | (2006.01) |

(52) U.S. Cl.
CPC ..... *F02D 41/0215* (2013.01); *F02D 41/0255* (2013.01); *B60K 6/365* (2013.01); *B60L 2240/423* (2013.01); *B60L 2240/441* (2013.01); *B60W 10/06* (2013.01); *F02D 2041/026* (2013.01); *F02N 11/04* (2013.01)

(58) Field of Classification Search
CPC . F02D 41/0255; F02D 2041/026; F02N 11/04
See application file for complete search history.

(56) References Cited

U.S. PATENT DOCUMENTS

| | | | |
|---|---|---|---|
| 7,125,362 B2* | 10/2006 | Beaty | B60W 10/06 477/3 |
| 7,628,009 B2 | 12/2009 | Hu et al. | |
| 8,235,853 B2 | 8/2012 | Lutoslawski | |
| 8,997,456 B2* | 4/2015 | Wolk | F02D 41/0007 60/280 |
| 2003/0166429 A1* | 9/2003 | Tumback | B60L 50/61 475/5 |
| 2007/0044453 A1* | 3/2007 | Strauser | F01N 3/035 60/286 |
| 2010/0071656 A1* | 3/2010 | Freese, V | F01L 13/0005 123/198 F |
| 2012/0090294 A1* | 4/2012 | Sujan | B60W 20/16 60/274 |
| 2015/0069832 A1* | 3/2015 | Yamane | B60L 50/51 307/10.1 |
| 2015/0226171 A1* | 8/2015 | Kees | B60W 30/194 290/31 |
| 2016/0242356 A1* | 8/2016 | Velderman | A01D 69/025 |
| 2017/0130635 A1* | 5/2017 | Smith | F01N 11/002 |
| 2017/0152781 A1* | 6/2017 | Free | F02M 26/43 |

\* cited by examiner

FAST COLD START HEAT UP AND ENERGY EFFICIENCY FOR COMMERCIAL VEHICLE POWERTRAIN

CROSS-REFERENCE TO RELATED APPLICATIONS

This application is a continuation of International Application No. PCT/US2018/021565 filed Mar. 8, 2018, which claims the benefit of U.S. Patent Application No. 62/468,434 filed on Mar. 8, 2017, U.S. Patent Application No. 62/500,625 filed on May 2, 2017 and U.S. Patent Application No. 62/567,403 filed on Oct. 3, 2017. The disclosures of the above applications are incorporated herein by reference.

FIELD

The present disclosure relates generally to a transmission system and related method for operating a motor generator coupled to a countershaft of the transmission system at engine startup to create higher exhaust heat in the exhaust aftertreatment.

BACKGROUND

Automated mechanical transmission (AMT) systems for vehicle use are known in art. As is well known, an AMT includes a clutch and a collection of gears. The AMT performs gear shifts automatically. AMTs can be provided on many vehicles including line haul vehicles and large construction vehicles. Fuel economy regulations are driving the need for greater fuel efficiency in both line haul and vocational vehicles.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A transmission system constructed in accordance to one example of the present disclosure includes an aftertreatment system and a controller. The transmission system is selectively coupled to an engine crankshaft of an internal combustion engine arranged on a vehicle. The aftertreatment system reduces emissions in an exhaust of the internal combustion engine. The controller operates in an aftertreatment heat-up mode such that the aftertreatment system is heated up to an elevated temperature and emissions are thereby reduced based on the elevated temperature. The controller operates in the aftertreatment heat-up mode when the internal combustion engine is operating at or below a brake mean effective pressure between three and four bar. The aftertreatment heat-up mode comprises increasing load on the internal combustion engine.

According to other features, increasing the load comprises running the engine in cylinder deactivation mode. In other features, increasing the load comprises running the transmission system in a non-optimized gear ratio. Increasing the load can further include directing power to a vehicle accessory. Increasing the load can include running the transmission system in a non-optimized gear ratio.

The transmission system can further include a transmission having an input shaft, a mainshaft, an output shaft and a countershaft offset from the input shaft. The countershaft can be drivably connected to the first input shaft and the mainshaft. A motor generator can be selectively coupled to the countershaft. Increasing the load can comprise directing substantially 20 kW to the motor generator during the aftertreatment heat-up mode. The controller can direct power to a vehicle accessory in the aftertreatment heat-up mode. Power can be routed through drive wheels during aftertreatment heat-up mode. The motor generator is one of a 12 volt, 24 volt and a 48 volt motor.

The transmission system can further comprise an integrated motor drive and converter that is electrically connected to the motor generator. The integrated motor drive and converter can include a three-phase inverter. A first battery can be electrically coupled to the integrated motor drive and converter. The first battery can be electrically coupled to vehicle accessories. Vehicle accessories can include at least one of a cooling system, an air compressor and an electric power steering system. The aftertreatment system heats up to a desired temperature within 400 seconds of engine start. In other features, the aftertreatment system heats up to a desired temperature within 50 seconds of engine start.

A transmission system constructed in accordance to additional features of the present disclosure includes a transmission, a motor generator, an aftertreatment system and a controller. The transmission system is selectively coupled to an engine crankshaft of an internal combustion engine arranged on a vehicle. The transmission has an input shaft, a mainshaft, an output shaft and a countershaft offset from the input shaft. The countershaft is drivably connected to the first input shaft and the mainshaft. The motor generator is selectively coupled to the countershaft. The aftertreatment system reduces emissions in an exhaust of the internal combustion engine. The controller directs power to the motor generator at startup during an aftertreatment heat-up mode such that the aftertreatment system is heated up to an elevated temperature and emissions are thereby reduced based on the elevated temperature.

According to other features, the controller directs power to a vehicle accessory in the aftertreatment heat-up mode. The controller directs substantially 20 kW to the motor generator during the aftertreatment heat up mode. Power is routed through drive wheels during the aftertreatment heat-up mode. A planetary gear set can be coupled between the countershaft and the motor generator. An integrated motor drive and converter can be electrically connected to the motor generator. The motor generator is one of a 12 volt, 24 volt and a 48 volt motor. The integrated motor drive and converter includes a three-phase inverter. In additional features, the transmission system includes a first battery electrically coupled to the integrated motor drive and converter. The first battery is electrically coupled to vehicle accessories. The vehicle accessories include at least one of a cooling system, an air compressor and an electric power steering system.

In other features, the internal combustion engine operates between one of a normal operating mode wherein all cylinders are firing and a cylinder deactivation mode wherein less than all cylinders are firing. The controller runs the internal combustion engine at startup in the cylinder deactivation mode to further heat up the aftertreatment system. In one arrangement, the normal operating mode comprises operating six cylinders. In one arrangement, the cylinder deactivation mode comprises firing one of two or four of the six cylinders.

A control method for operating an automated transmission system in an aftertreatment heat-up mode on a vehicle is provided. The vehicle has a fuel-controlled engine, a multiple-speed change-gear transmission having an input shaft, an output shaft, a countershaft, and a master clutch drivingly interposed between the engine and the input shaft of the transmission. Control determines whether the vehicle is in a start-up mode. Control routes power from the countershaft to a motor generator. The motor generator is driven such that the aftertreatment system is heated up to an elevated temperature and emissions are thereby reduced based on the elevated temperature.

In additional features, control charges a vehicle battery while driving the motor generator through an integrated motor drive and converter. Control can further supply power to a vehicle accessory during the aftertreatment heat-up mode. Control can operate the engine in a cylinder deactivation mode.

BRIEF DESCRIPTION OF THE DRAWINGS

The present disclosure will become more fully understood from the detailed description and the accompanying drawings, wherein:

FIG. 7A is a cold cycle plot according to one example of the present disclosure;

FIGS. 8A and 8B illustrate background plots of aftertreatment heat up turbine outlet and SCR temperature during heavy duty (HD) federal test procedure (FTP);

DETAILED DESCRIPTION

The following disclosure is directed toward optimizing aftertreatment efficiency. Federal Test Protocol (FTP) are forcing current engine design trends to require lower emissions and improved fuel economy. As is known, nitrogen oxides (NOx) aftertreatment systems are temperature sensitive. High NOx conversion begins between 220 C and 280 C depending on catalyst formulation. In particular, as viewed in FIG. 3, NOx conversion can have an efficiency above 95% when the selective catalytic reduction catalyst (SCR) catalyst temperature is between 300 C and 450 C. Typically at startup, idle exhaust temperatures can be between 110 C and 150 C. In this regard, an amount of time is needed for the exhaust to heat up from the typical exhaust temperatures to the elevated temperatures that satisfy the desired 95% (or above) efficiency target. Engine operation during this amount of time is inefficient for NOx conversion. In some examples this amount of time is around 600 seconds. The present disclosure provides configurations and control strategies to elevate exhaust temperatures quickly, minimizing this amount of inefficient operating time and arriving at the desired 95% efficiency range.

As will become appreciated from the following discussion, the instant disclosure replaces a vehicle electrical system from a traditional "front end accessory drive" (FEAD) that drives accessory components such as the electrical charging system (alternator) and the compressor that drives the HVAC air conditioner. The vehicle electrical system according to the present disclosure is instead driven by the transmission countershaft. Such a configuration allows a new operating mode of coasting while the engine is off (Engine Off Coasting or EOC), while still providing electrical power by driving the charging system from the vehicle wheels while the engine is stopped (defueled) and the vehicle is still moving.

Figure 1A:
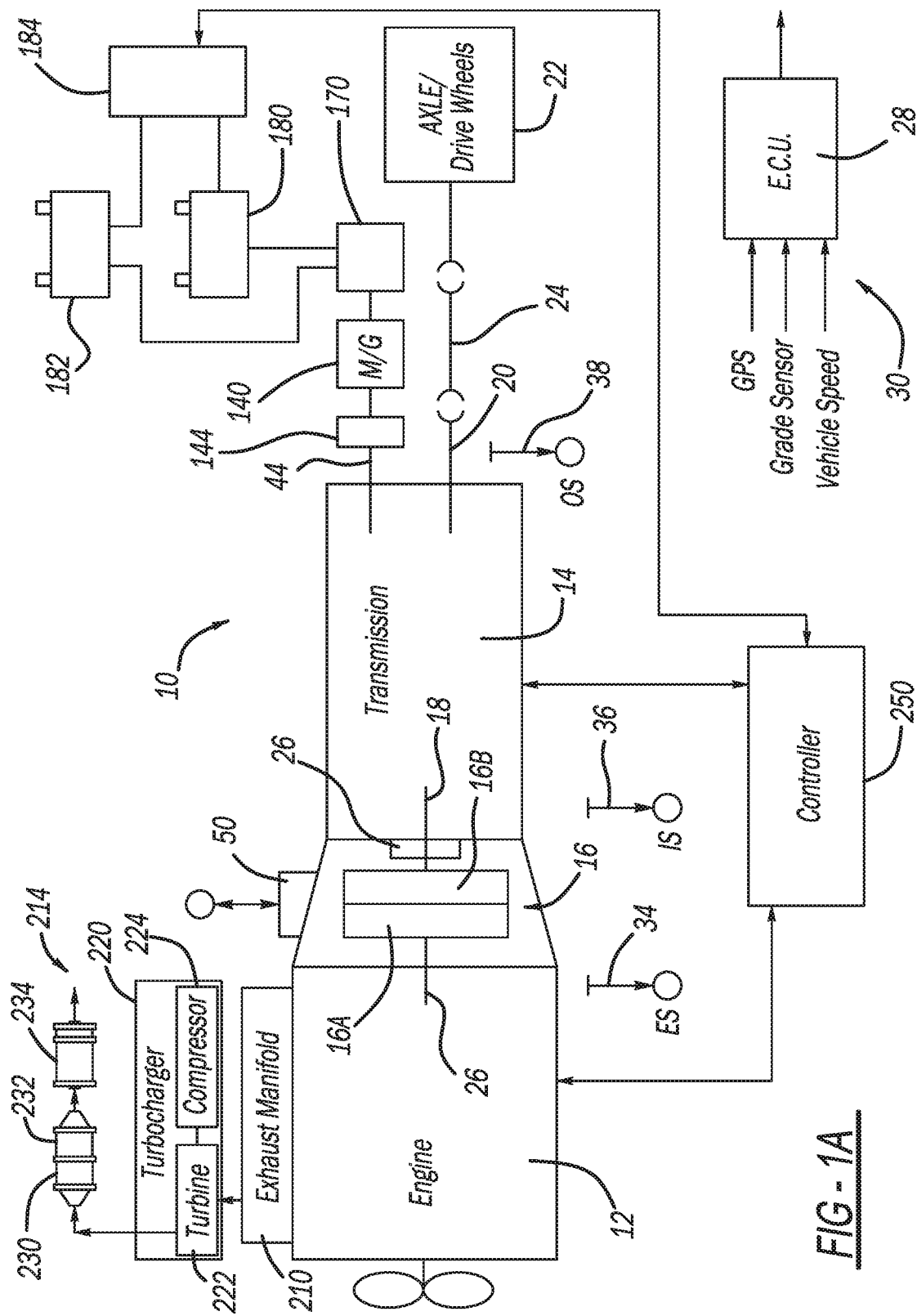
FIG. 1A is a schematic of a transmission system constructed in accordance to the present disclosure and configured to implement various aftertreatment heat-up modes.
Figure 1B:
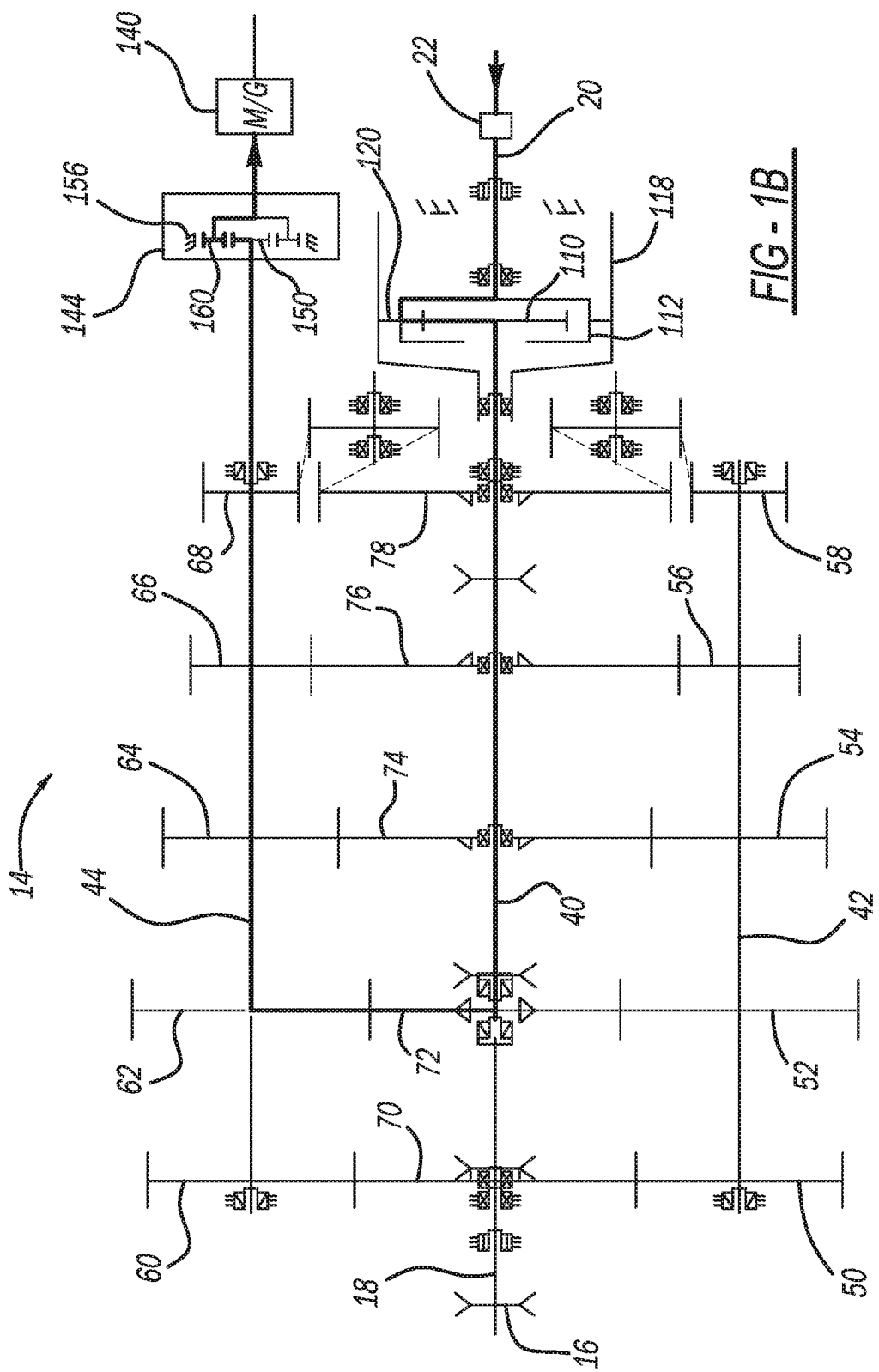
FIG. 1B is a schematic of an automated mechanical transmission system coupled to an engine, the transmission system having a motor generator coupled to a countershaft according to one example of the present disclosure.

With initial reference to FIGS. 1A and 1B, an AMT system constructed in accordance to one example of the present disclosure and referred to at reference 10. The AMT system 10 is selectively coupled to a fuel-controlled engine 12 (such as a diesel engine or the like), a multiple-speed, change-gear transmission 14 and a master clutch 16 drivingly interposed between the engine 12 and an input shaft 18 of the transmission 14. The transmission 14 may be of the compound type comprising a main transmission section connected in series with a splitter and/or range-type auxiliary section. Transmissions of this type, especially as used with heavy duty vehicles, typically have 9, 10, 12, 13, 16 or 18 forward speeds. A transmission output shaft 20 extends outwardly from the transmission 14 and is drivingly connected with vehicle drive axles 22, usually by means of a prop shaft 24.

The master clutch 16 includes a driving portion 16A connected to an engine crankshaft/flywheel 26 and a driven portion 16B coupled to the transmission input shaft 18 and adapted to frictionally engage the driving portion 16A. An electronic control unit (ECU) 28 is provided for receiving input signals 30 and for processing same in accordance with predetermined logic rules to issue command output signals 32 to the transmission system 10. The system 10 can also include a rotational speed sensor 34 for sensing rotational speed of the engine 12 and providing an output signal (ES) indicative thereof, a rotational speed sensor 36 for sensing the rotational speed of the input shaft 16 and providing an output signal (IS) indicative thereof, and a rotational speed sensor 38 for sensing the speed of the output shaft 20 and providing an output signal (OS) indicative thereof. The master clutch 16 may be controlled by a clutch actuator 50 responding to output signals from the ECU 28.

The transmission 14 has one or more mainshaft sections 40. The mainshaft 40 is coaxial with the input shaft 18. The transmission 14 has a first countershaft 42 and a second countershaft 44. The countershafts 42 and 44 are offset from the input shaft 18 and the mainshaft 40. The countershafts 42 and 44 are illustrated as being offset from one another, however in some examples the countershafts 42 and 44 may be coaxial with each other. The output shaft 20 may be coaxial with the mainshaft 40.

The first countershaft 42 is supported for rotation by the transmission 14 housing by bearings. The first countershaft 42 of the transmission 14 has countershaft gears 50, 52, 54, 56 and 58. The second countershaft 44 is supported for rotation by the transmission 14 housing by bearings. The second countershaft 44 of the transmission 14 has countershaft gears 60, 62, 64, 66 and 68. The mainshaft 40 of the transmission 14 has mainshaft gears 70, 72, 74, 76 and 78. The master clutch 16 can selectively communicate torque into the transmission 14. A headset clutch 84, a first sliding dog clutch 88 and a second sliding dog clutch 90 can move left and right as viewed in FIG. 2 to connect various mainshaft gears 70-78 and countershaft gears 50-58 and 60-68 for attaining a desired drive gear and torque path within the transmission 14.

The right hand end of the mainshaft 40 is drivably connected to a sun gear 110. A planetary carrier 112 is connected to or is integral with the output shaft 20, which is connected drivably through a drive axle 22 to vehicle traction wheels. A ring gear 118 engages planet pinions 120 carried by the carrier 112.

According to one example of the present disclosure, a motor generator 140 can be selectively coupled to the second countershaft 44 (or the transmission power take-off, PTO). As will become appreciated herein, the motor generator 140 is configured to run in two opposite modes. In a first mode, the motor generator 140 operates as a motor by consuming electricity to make mechanical power. In a second mode, the motor generator 140 operates as a generator by consuming mechanical power to produce electricity. In one configuration a planetary gear assembly 144 can be coupled between the second countershaft 44 and the motor generator 140. The planetary gear assembly 144 can be a speed up gear assembly having a sun gear 150. A planetary carrier 152 is connected to or integral with the second countershaft 44, which is connected drivably to the motor generator 140. A ring gear 156 engages planet pinions 160 carried by the carrier 152.

By way of example only the motor generator 140 can be a 6-20 Kilowatt, 24-48 volt motor. The motor generator 140 can be ultimately driven by the second countershaft 44 and be electrically connected to an integrated motor drive and converter 170. The integrated motor drive and converter 170 can provide voltage down conversion and battery management. In the non-limiting example provided, the integrated motor drive and converter 170 can be a 24-48 volt three-phase inverter. A first battery 180 can be electrically connected to the integrated motor drive and converter 170. A second battery 182 can be electrically connected to the integrated motor drive and converter 170. The first battery 180 can be a 24-48 volt battery that powers various battery powered components 184 of the vehicle such as hybrid cooling, heating ventilation and air conditioning (HVAC), an air compressor, power steering and other components. While the above description sets for 24 and 48 volt implementation, in other examples, the motor generator and related components can be configured for 12 volt operation. Further, in other examples, the transmission system 10 can incorporate an alternator in a generating only mode without the need for the integrated motor drive and converter 170. In the drawings, the feature 140 would be an alternator. It will be appreciated that the transmission system 10 can use only an alternator such that inertia brake and synchronization can be carried out given the second countershaft 44 is decelerating and not accelerating.

Figure 2:
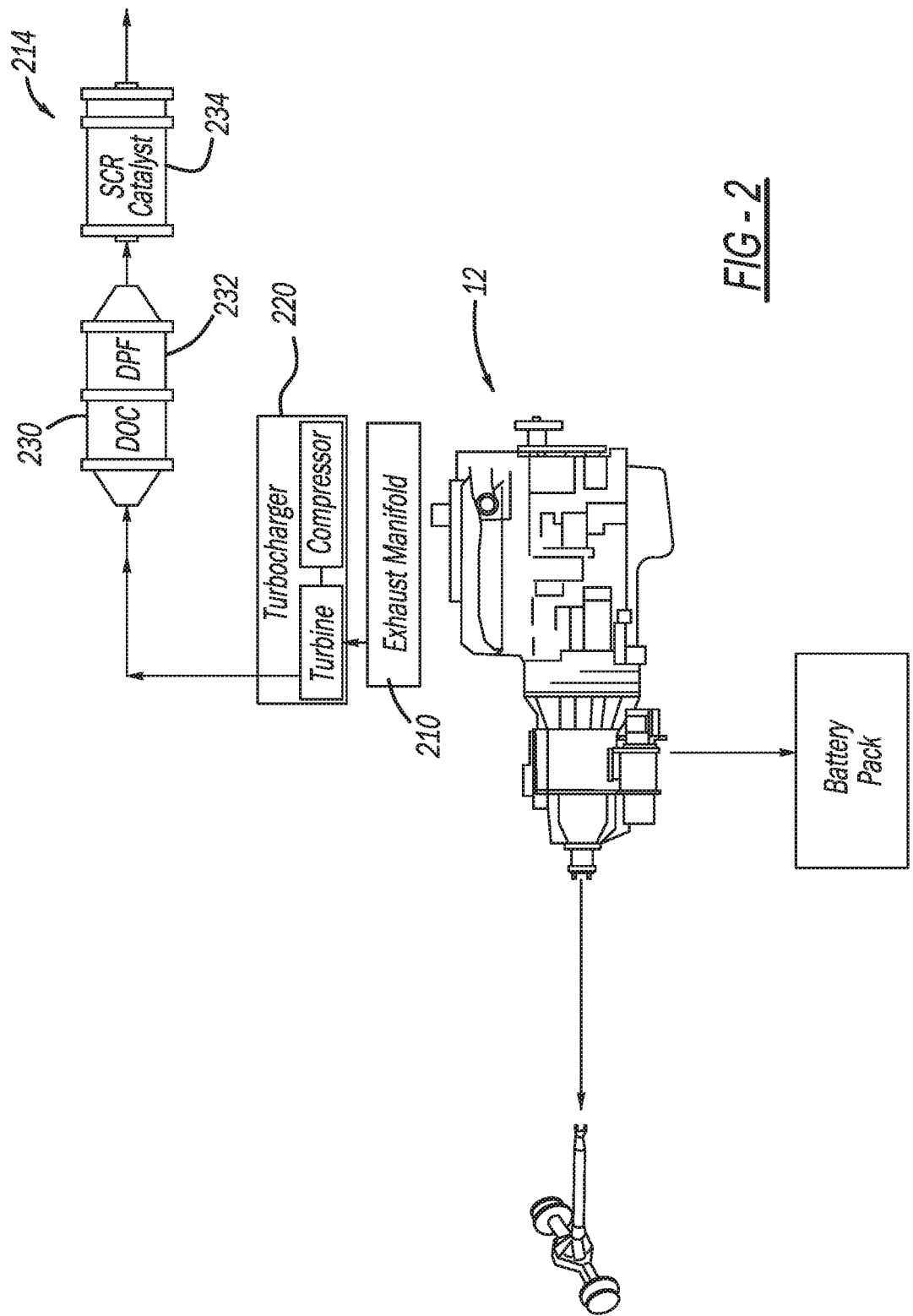
FIG. 2 is a another schematic illustration of the automated mechanical transmission system of FIG. 1.

With particular reference to FIG. 1A-2, additional features of the instant disclosure will be described in further detail. The engine 12 includes an exhaust manifold 210 that directs exhaust to an aftertreatment assembly 214 including a turbocharger system 220 having a turbine 222 and compressor 224. As is known, diesel exhaust can contain emissions including carbon monoxide (CO), unburned hydrocarbons (HC), nitrogen oxides (NOx) and particulate matter such as soot. The aftertreatment assembly 214 can further include a diesel oxidation catalyst (DOC) 230, a diesel particulate filter (DPF) 232 and a selective catalytic reduction catalyst (SCR) 234.

The DOC 230 can be placed in the exhaust gas stream of a diesel engine and typically contain a platinum group metals and/or base metals. These catalysts promote the conversion of OC and HC emissions to carbon dioxide and water. The SCR 234 is used to convert NOx and $N_2$ and can comprise a base metal and utilize an ammonia reductant such as aqueous urea. The aqueous urea can be injected in the exhaust stream downstream from the DOC 230. The formed ammonia reacts with the NOx in the exhaust gas stream on the SCR 234 to form $N_2$. The DPF 232 collects soot from the engine exhaust. Accumulated particles are combusted at elevated temperatures to regenerate the filter.

Figure 3:
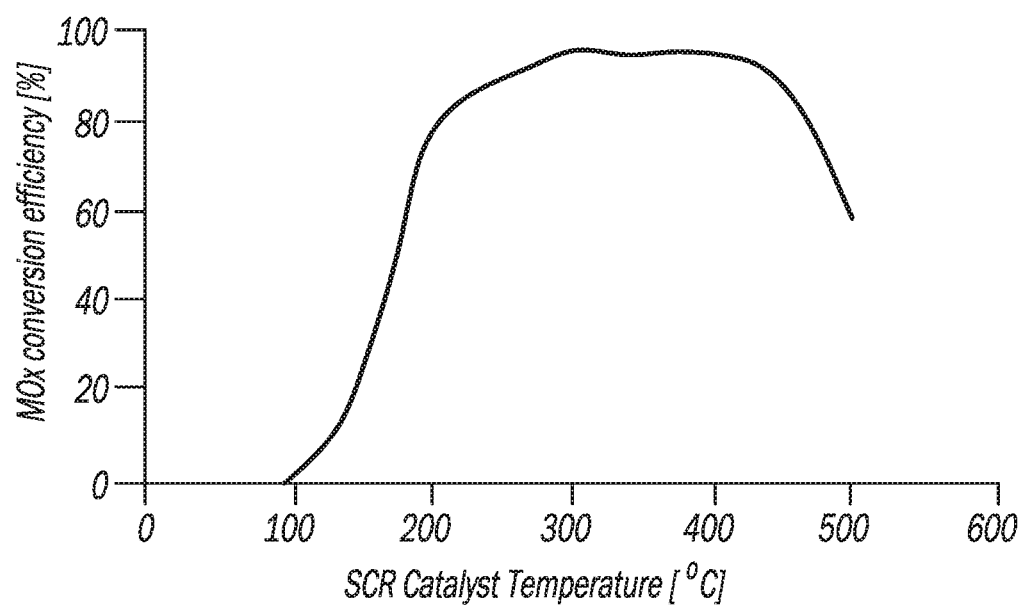
FIG. 3 is diagram illustrating NOx conversion efficiency versus selective catalytic reduction (SCR) temperature.

As shown in FIG. 3, the sweet spot for NOx conversion is generally between 300 C to 450 C. In this regard, it is desirable to heat up the aftertreatment assembly 214 quickly at startup. The teachings of the preset disclosure provide a system and method for operating the engine 12 in a fast heat-up mode. As used herein, the term "startup" is used to denote a period of time needed to reach the desired sweet spot for NOx conversion (300 C to 450 C). In other words, "startup" is used to define a period of time from engine crank to reaching the desired hot catalyst temperature.

Figure 4:
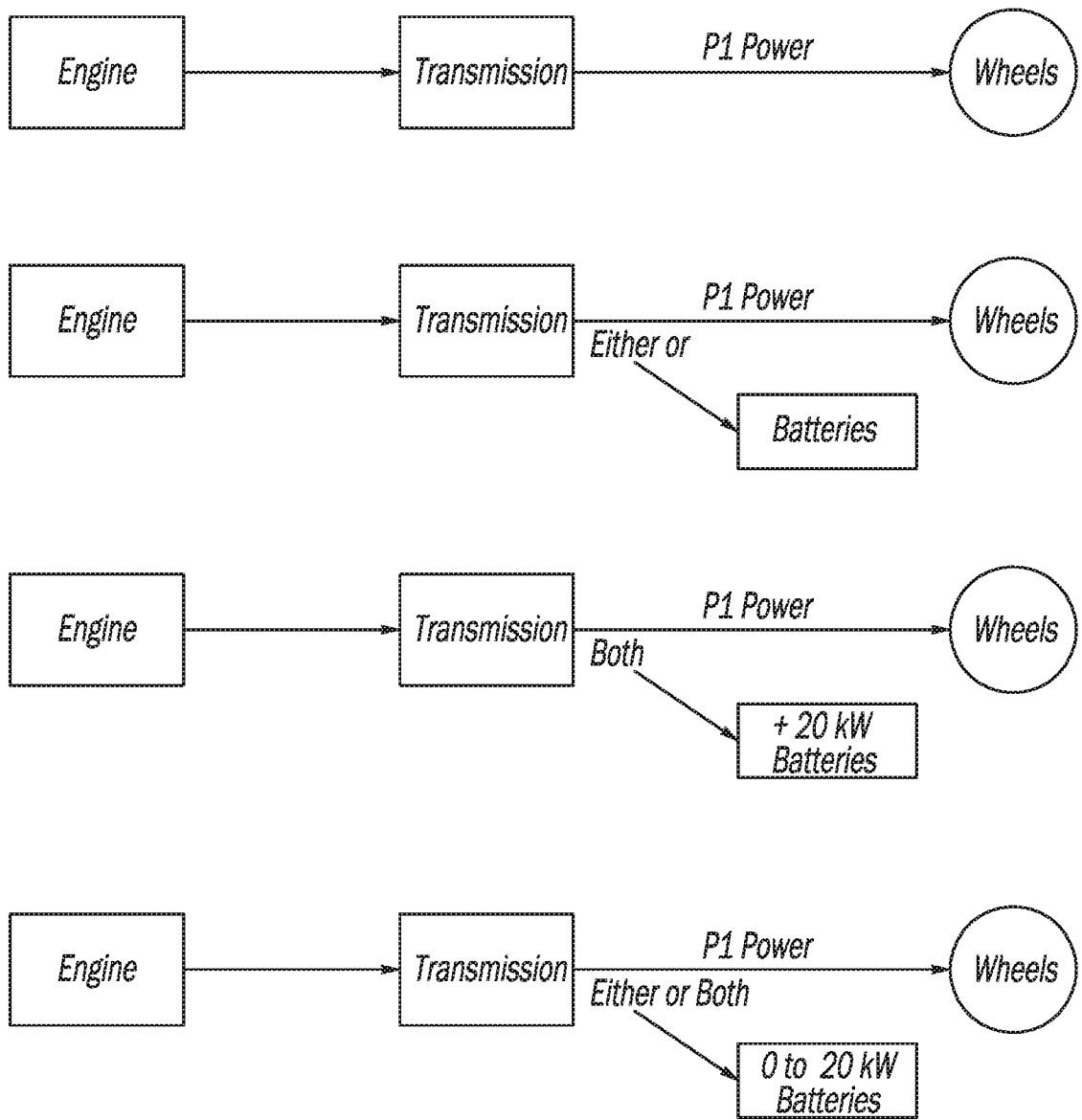
FIG. 4 illustrate various power flow scenarios for configurations according to the present disclosure.

With reference to FIG. 4 two aftertreatment (fast) heat-up modes are shown according to the present disclosure. The aftertreatment heat-up modes provide extra load on the engine 12 to heat up the aftertreatment system 214 at cold startup and until the aftertreatment system 214 is heated up. The same power can be delivered to the wheels 22 while the extra load can be directed to the batteries 180, 182. In this regard, the motor generator 140 can implement a load onto the transmission 14 that can make the engine 12 run hot. As will become appreciated herein, the present disclosure provides many configurations and methods that may be used individually or in combination to load the engine 12 to make it run hot and therefore elevate the temperature of the aftertreatment system 214 to the desired range.

In some examples, it may not be necessary to account for extra load at startup if the aftertreatment system 214 is already hot. A controller 250 can manage engine power, transmission power routing and state of battery charge. A thermocouple provided in the aftertreatment system 214 can provide a signal to the controller 250 indicative of a temperature of the aftertreatment system 214. It will be appreciated that according to the present disclosure energy can be used by routing power (in this example +20 kW) to the batteries 180, 182. It will be appreciated that other kW may be routed such as 5 kW, 10 kW, 15 kW, 25 kW, 50 kW or other kW suitable to create load onto the engine 12. The more power that is being drawn, the quicker the engine 12 will get hot. The controller 250 can demand a continuous 20 kW of power or maintain a minimum or "floor" at 20 kW of power. When the power is above 20 kW the controller 250 can direct all power to the vehicle wheels 22 and stop charging the batteries 180, 182. In this regard, the transmission 14 can direct power to the wheels 22 or the batteries 180, 182. The engine 12 can still motor with both configurations as the transmission 14 directs power to the correct location. In one configuration, the power can be sent to the wheels 22 and the batteries 180, 182 concurrently. In another configuration, the transmission 14 can disconnect power to the wheels 22 when motoring.

Other means of routing power can be additionally or alternatively used within the scope of the present disclosure. For example power can be used (energy drawn) by turning on the engine fan, charging air tanks, using any vehicle accessory, turning on lights, turning on fans, running the transmission 14 inefficiently (such as in a non-optimized gear ratio and/or precluding downspeeding), etc. When the controller 250 routes the additional power, the engine 12 and therefore the aftertreatment system 214 will heat up quickly to achieve more efficient NOx conversion faster (see FIG. 3).

Figure 5A:
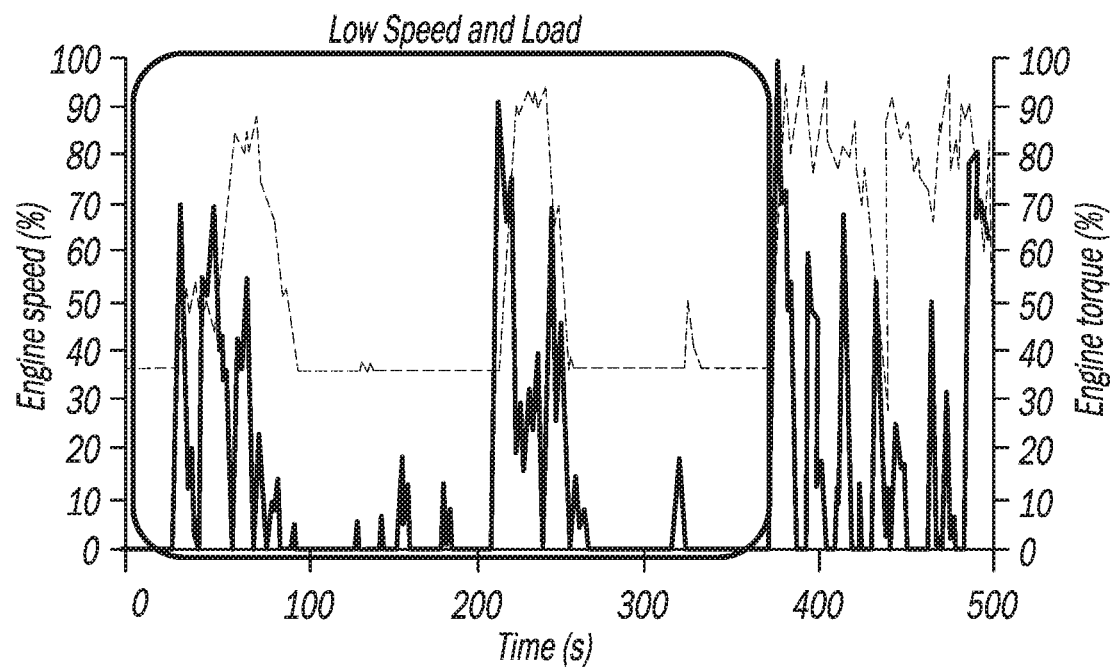
FIGS. 5A and 5B is illustrates background information showing NOx requirement standards changing and heat up targets according to various examples of the present disclosure.
Figure 5B:
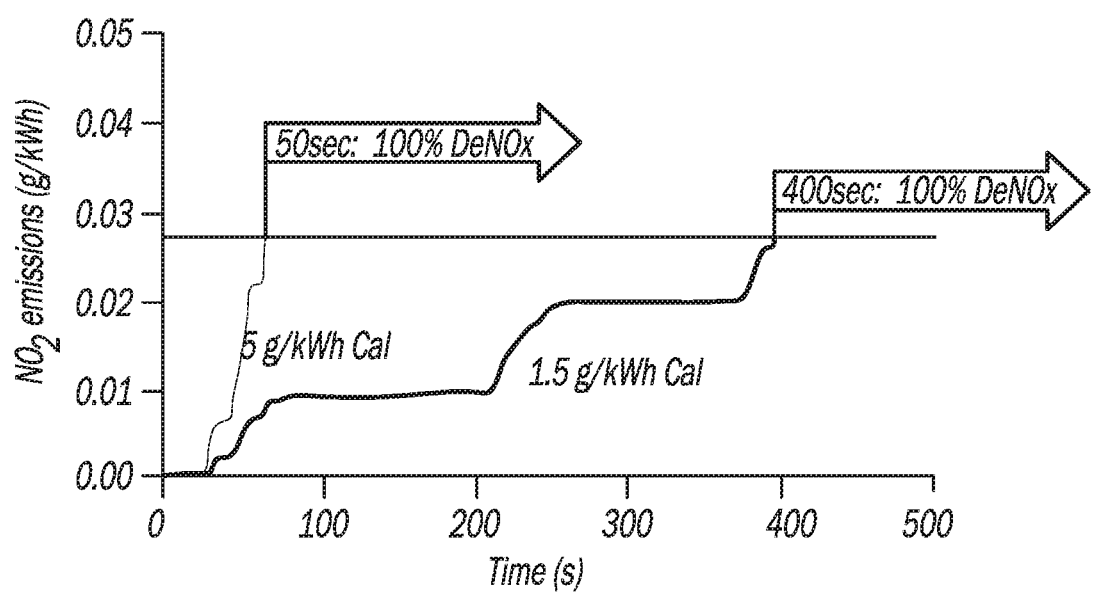

By way of example only, as shown in FIG. 5 the present disclosure is directed toward heating up the engine to a temperature that achieves the desired aftertreatment efficiency. A first plot illustrates running a 1.5 g/kWh of NOx (at engine out) calibration. A second plot illustrates running a 5 g/kWh of NOx (at engine out) calibration. When running a higher engine out NOx calibration, the fuel economy will be better. However, the aftertreatment system will exceed the desired limit at the tailpipe sooner. In this regard, when running 5 g/kWh of NOx (at engine out) calibration a 100% NOx conversion at 50 seconds into the cycle needs to be achieved. Similarly, when running 1.5 g/kWh of NOx (at engine out) calibration a 100% NOx conversion at 400 seconds (from engine start) into the cycle needs to be achieved. For emissions requirements in the year 2024, the engine is going to need to heat up by 400 seconds (and more preferably by 50 seconds) to meet Federal Test Protocol (FTP) requirements. The teachings of this disclosure provide solutions to heat up the aftertreatment system 214 fast for meeting this new requirement.

For perspective, in diesel engine configurations a conventional heat up mode may take up to ten minutes to reach the desired temperature for the aftertreatment system 214. The present disclosure provides solutions that heat up the aftertreatment system 214 significantly faster. The teachings of this disclosure can also be applicable to hybrid electric vehicles. In some examples the teachings are particularly useful in a hybrid electric configuration as the combustion engine is being used less and has less opportunity to get hot fast. In this regard, the motor generator 140 would be sized bigger as compared to what is set forth in FIGS. 1A-2. In other arrangements, the motor generator 140 can be coupled directly to the engine 12 without having the transmission 14 disposed therebetween. The point being, the motor generator 140 can be disposed at any position on the driveline where it demands load from the engine 12 making the engine reach higher temperatures faster.

Figure 6:
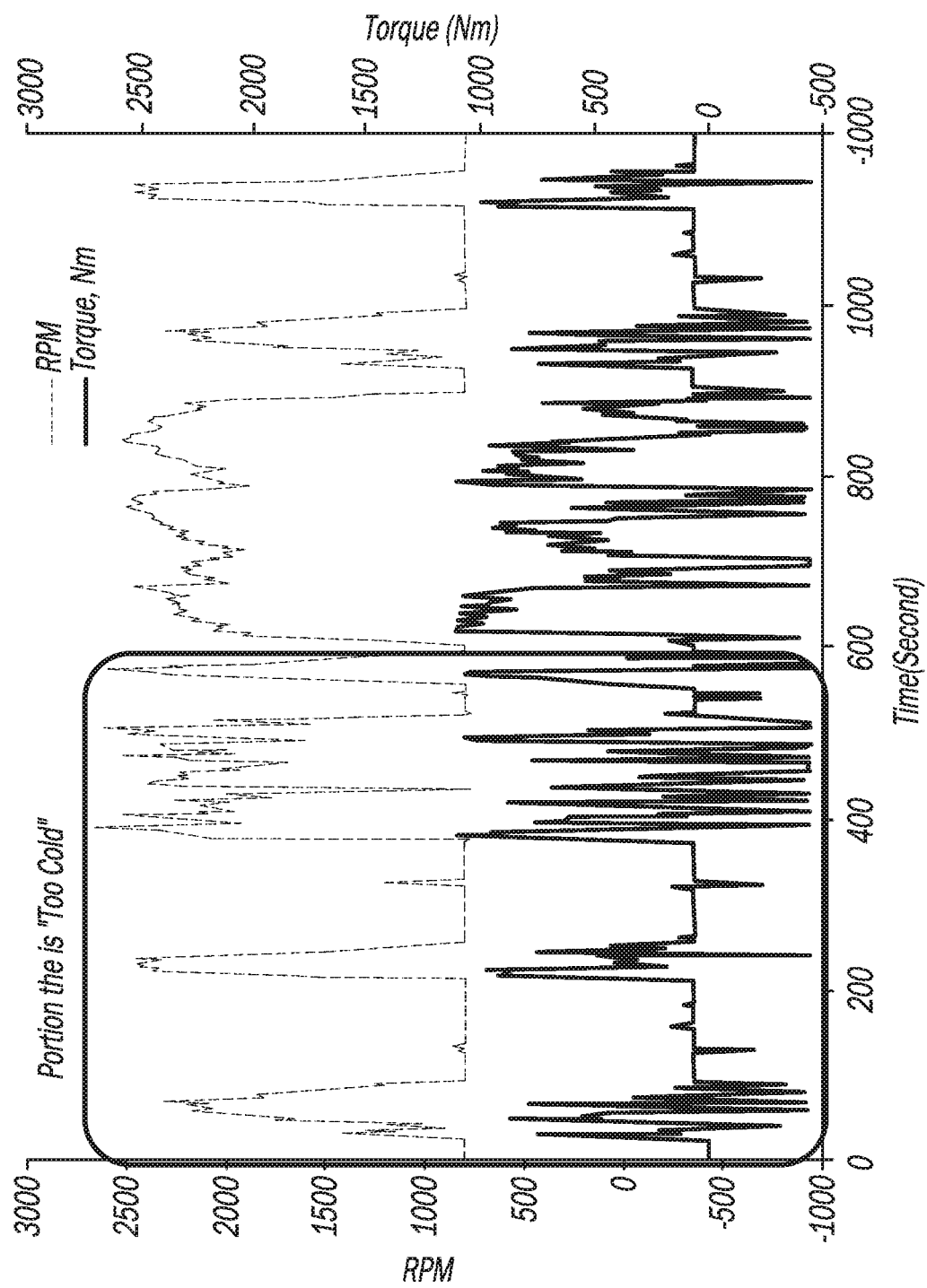
FIG. 6 is a plot of RPM and Torque examples wherein 0.02 g/hp-hr NOx is target in year 2024.
Figure 7A:
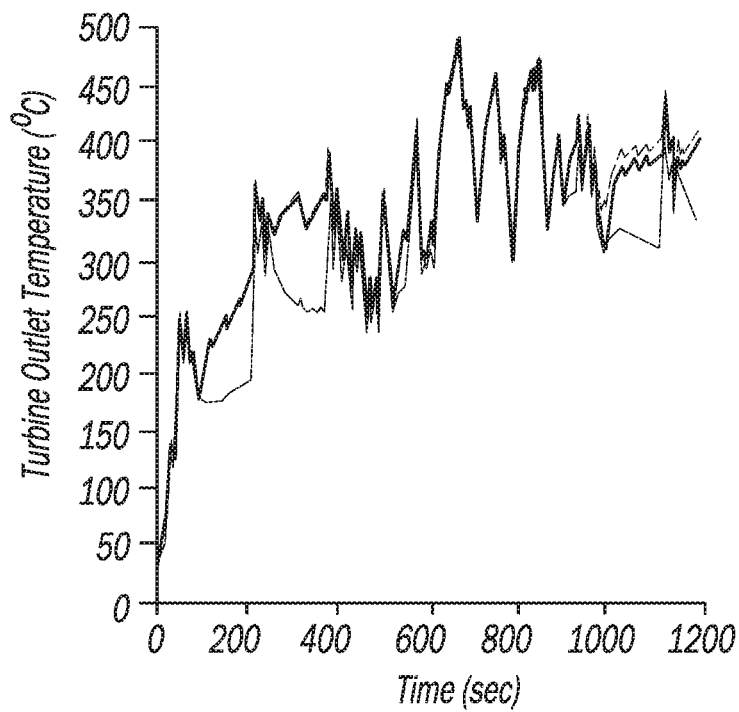
FIGS. 7A and 8A are plots of turbine outlet temperature during respective cold and hot 20 minute cycles.
Figure 7B:
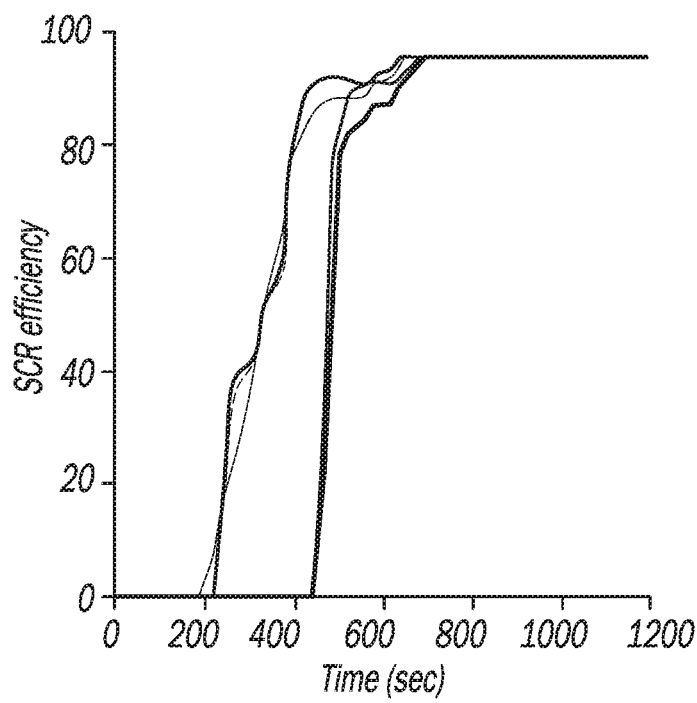
FIG. 7B is a plot of SCR efficiency for the cold cycle plot of FIG. 7A.
Figure 7C:
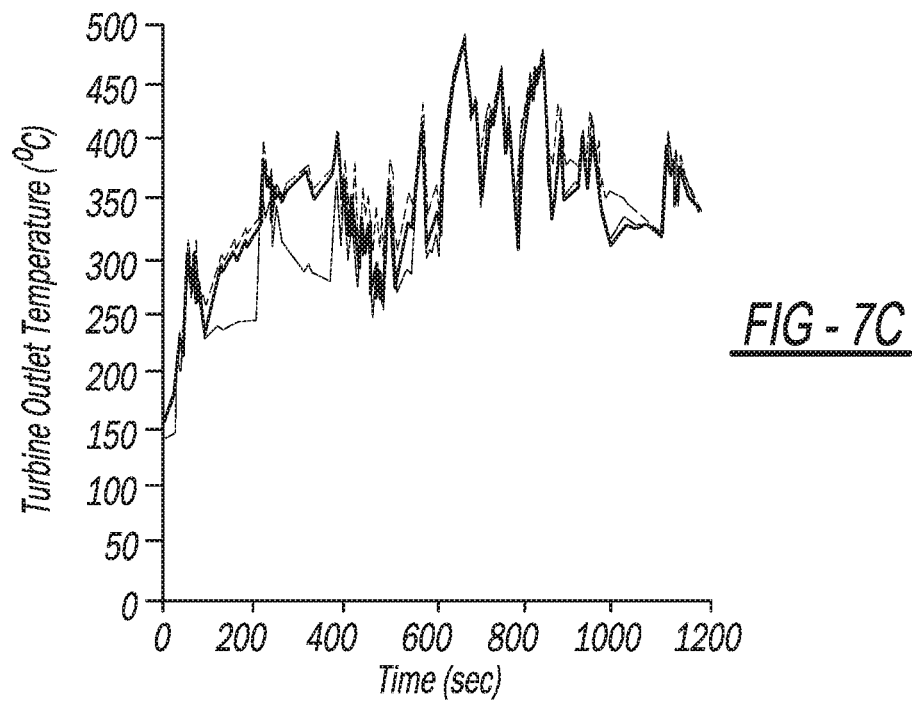
FIG. 7C is a hot cycle plot according to one example of the present disclosure.
Figure 7D:
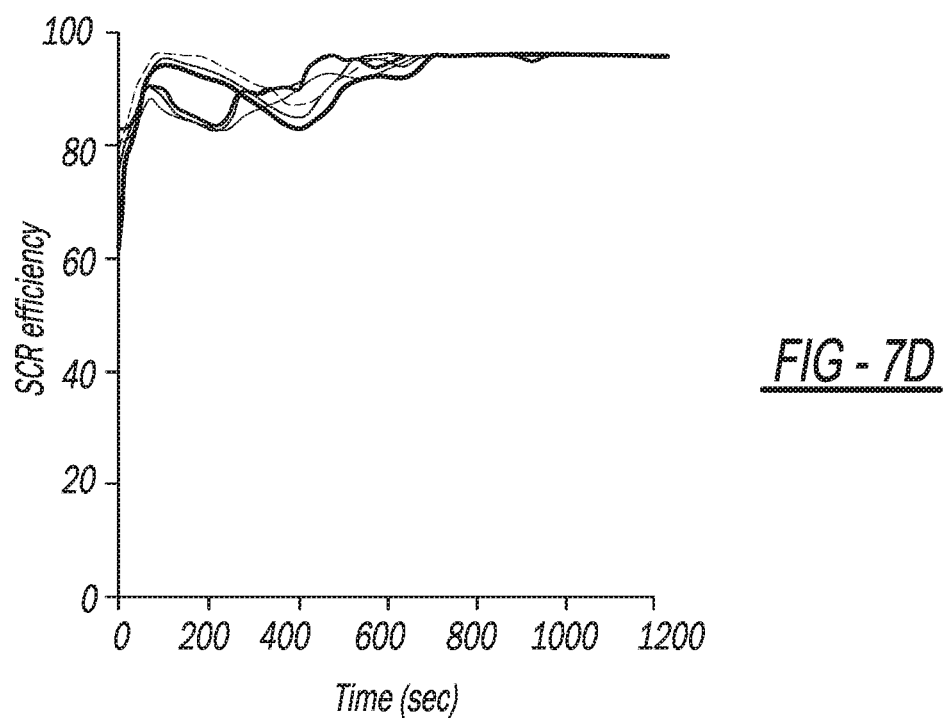
FIG. 7D is a plot of SCR efficiency for the hot cycle plot of FIG. 7C.
Figure 8A:
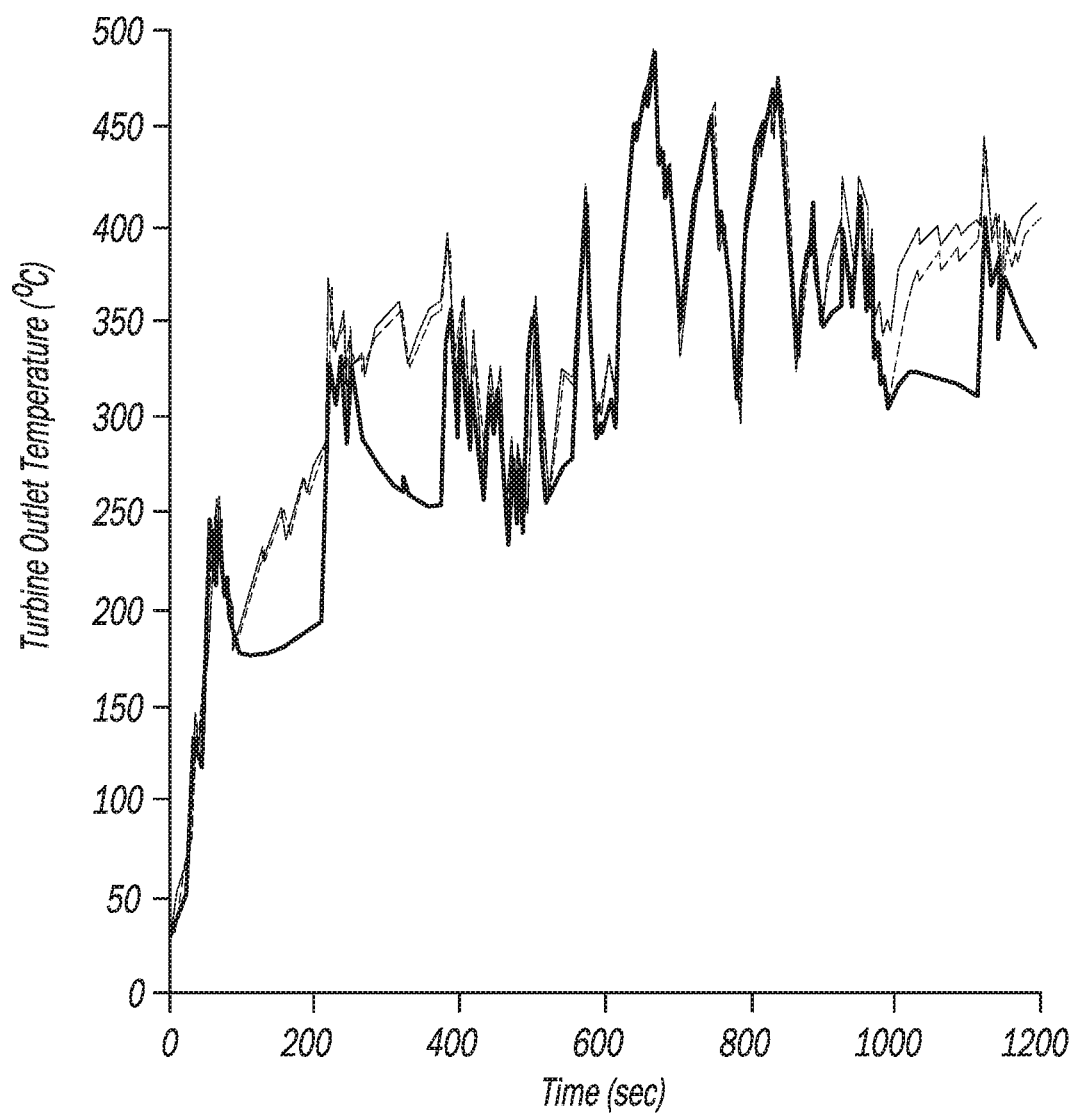
Figure 8B:
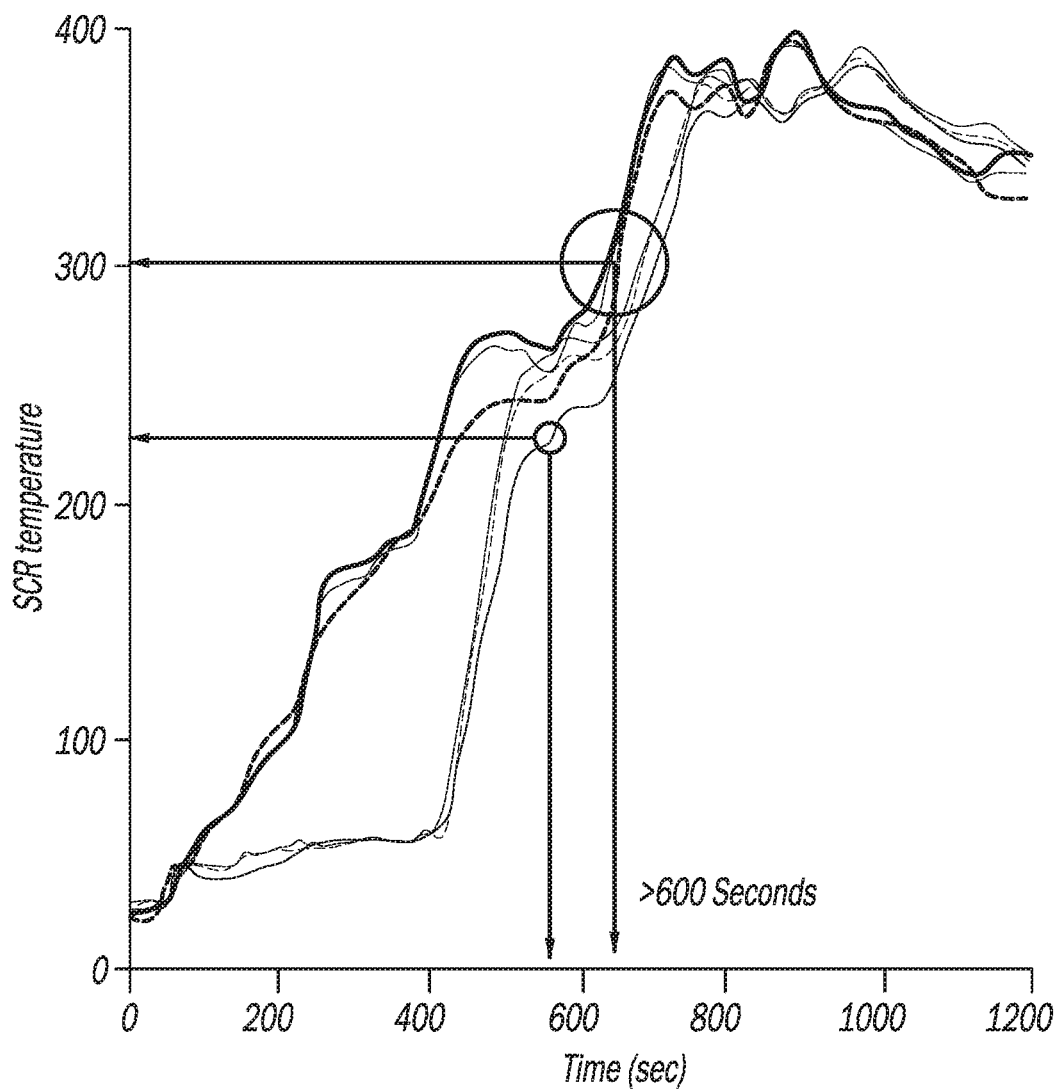

FIG. 6 illustrates an exemplary emission cycle test in a system that does not implement the fast heat-up teachings of the present disclosure. FIG. 6 shows time on the x-axis, RPM on the left y-axis and Torque in NM in the right y-axis. An area within 600 seconds is identified as too cold. It would be desirable to heat up quickly within this area. FIG. 7A illustrates outlet temperatures of the turbine 222 during the cycle shown in FIG. 6. Comparing FIG. 7A to the target catalyst temperature of 300 C to 450 C in FIG. 3, the turbine 222 is running too cold. FIG. 7B illustrates SCR efficiency as less than 95% which is undesirable. FIG. 7D shows SCR efficiency for a hot cycle shown in FIG. 7C. FIGS. 8A and 8B illustrate outlet temperature of the turbine 222 versus time for various engine operating modes (Thermal Management Calibration, exhaust gas recirculation (EGR), cylinder deactivation (CDA)). In general it will take more than 600 seconds to run the SCR 234 above 300 C.

Figure 9:
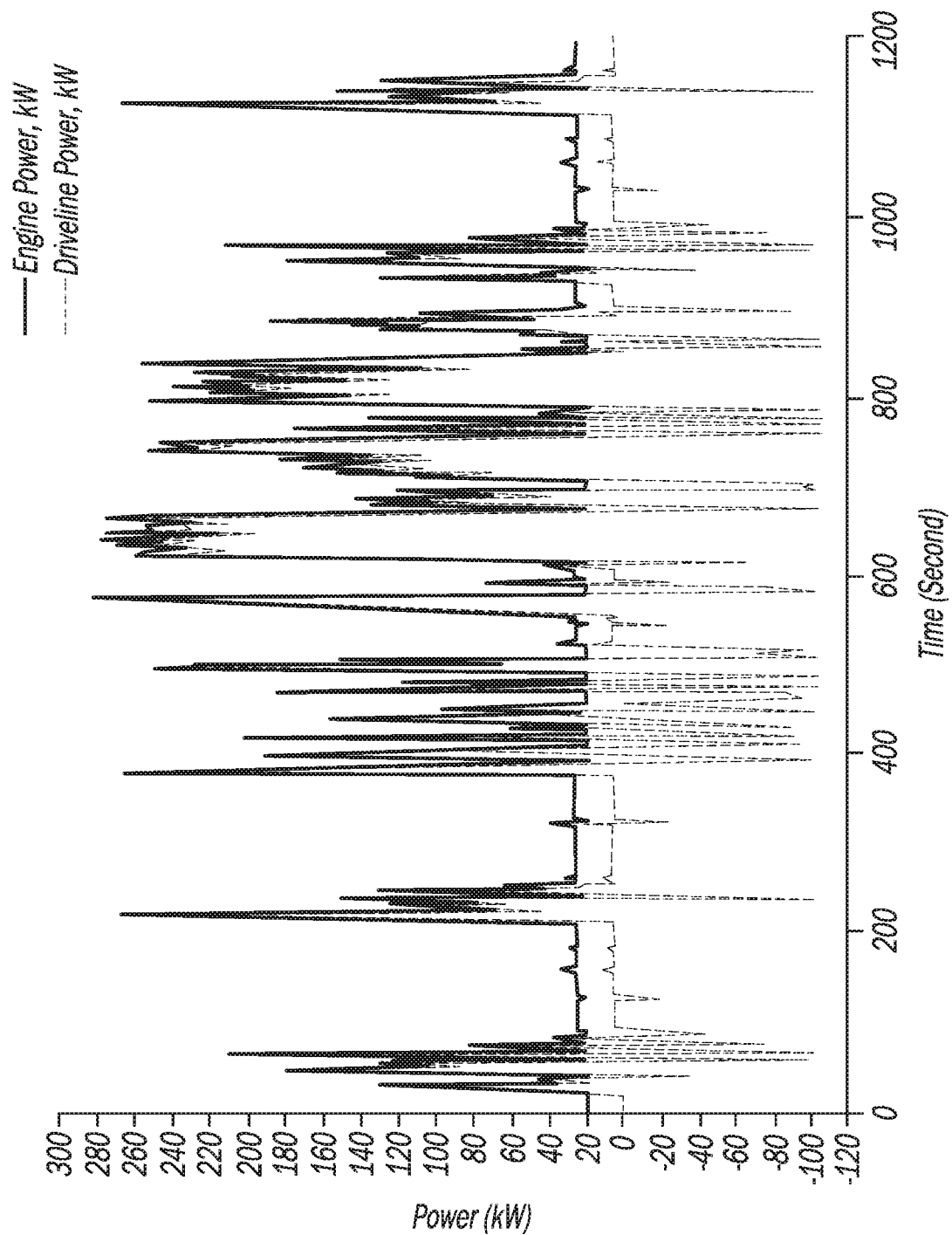
FIG. 9 illustrates HD FTP with 20 kW power to batteries showing a first plot of power demand during an emission cycle and a second plot showing an addition of 20 kW of power.
Figure 10:
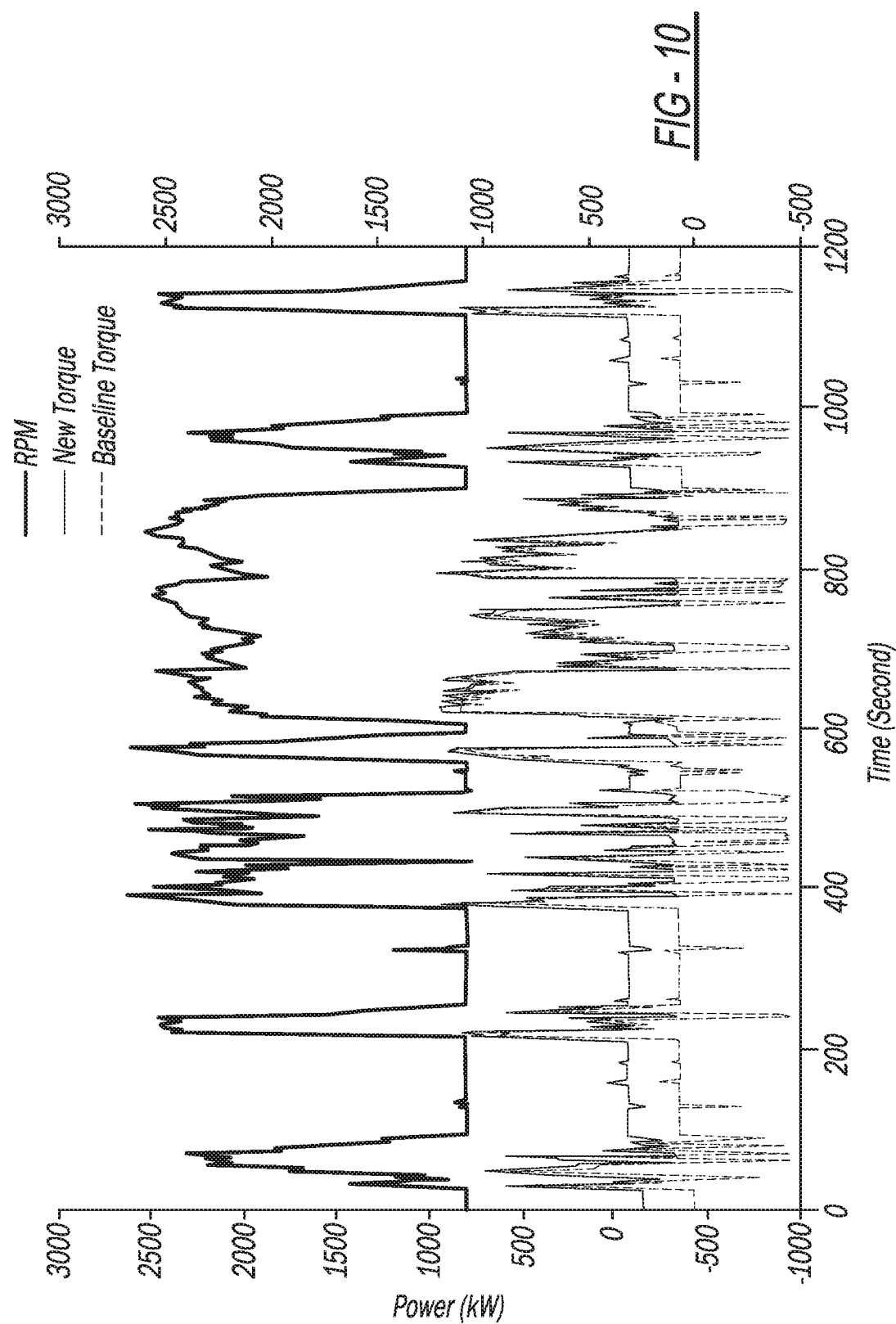
FIG. 10 shows a first plot of baseline torque, a second plot of new torque and a third plot of RPM according to the present disclosure.

FIG. 9 shows a first plot of power (torque times speed) demand during an emission cycle. A second plot shows an addition of 20 kW of power to the first plot. The engine runs hotter along the second plot. FIG. 10 shows a first plot of baseline torque, a second plot of new torque and a third plot of RPM. The second plot of new torque matches the power shown in FIG. 9.

Figure 11:
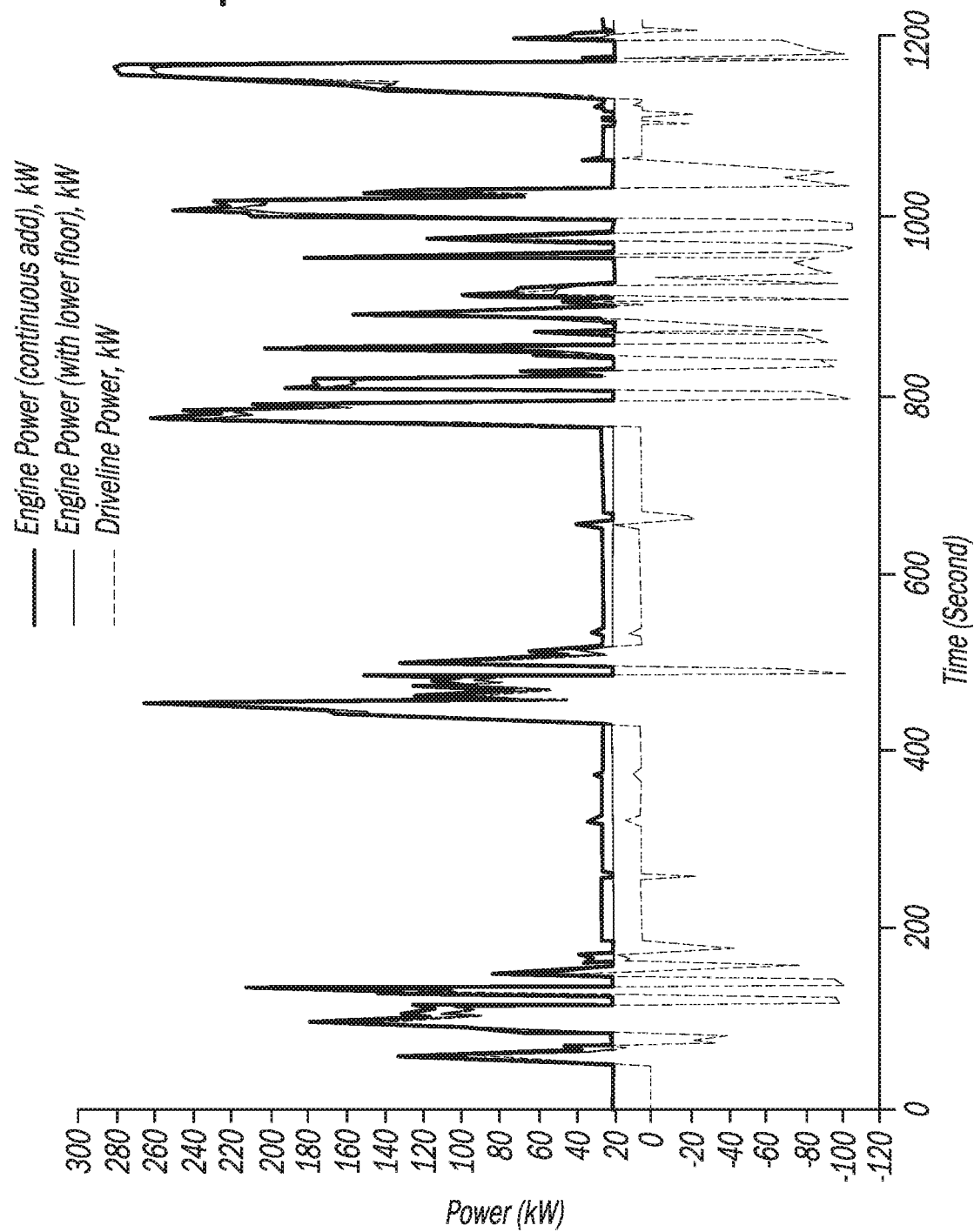
FIGS. 11 and 12 illustrate 20 kW continuous/floor power to batteries according to various examples of the present disclosure.
Figure 12:
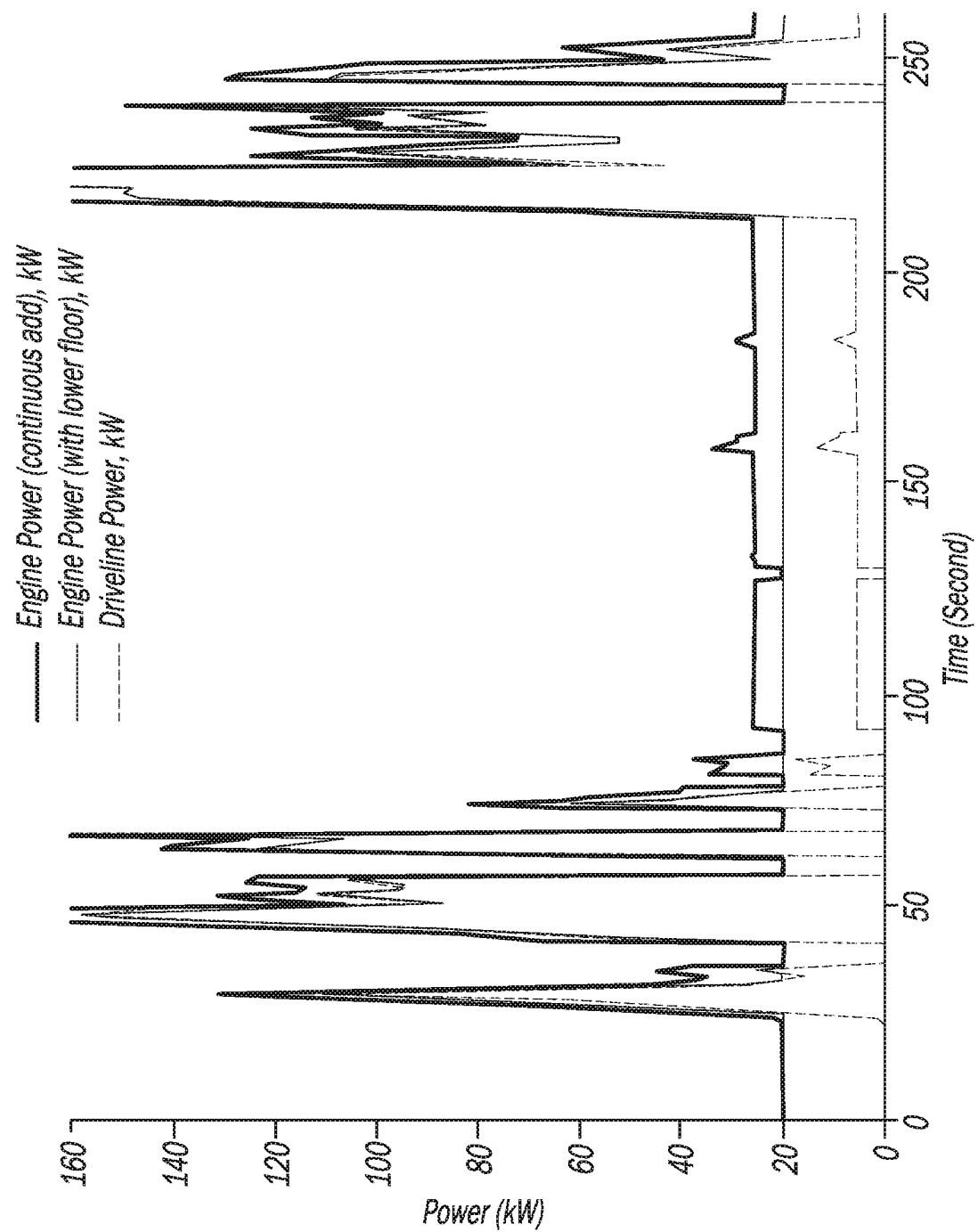
Figure 13:
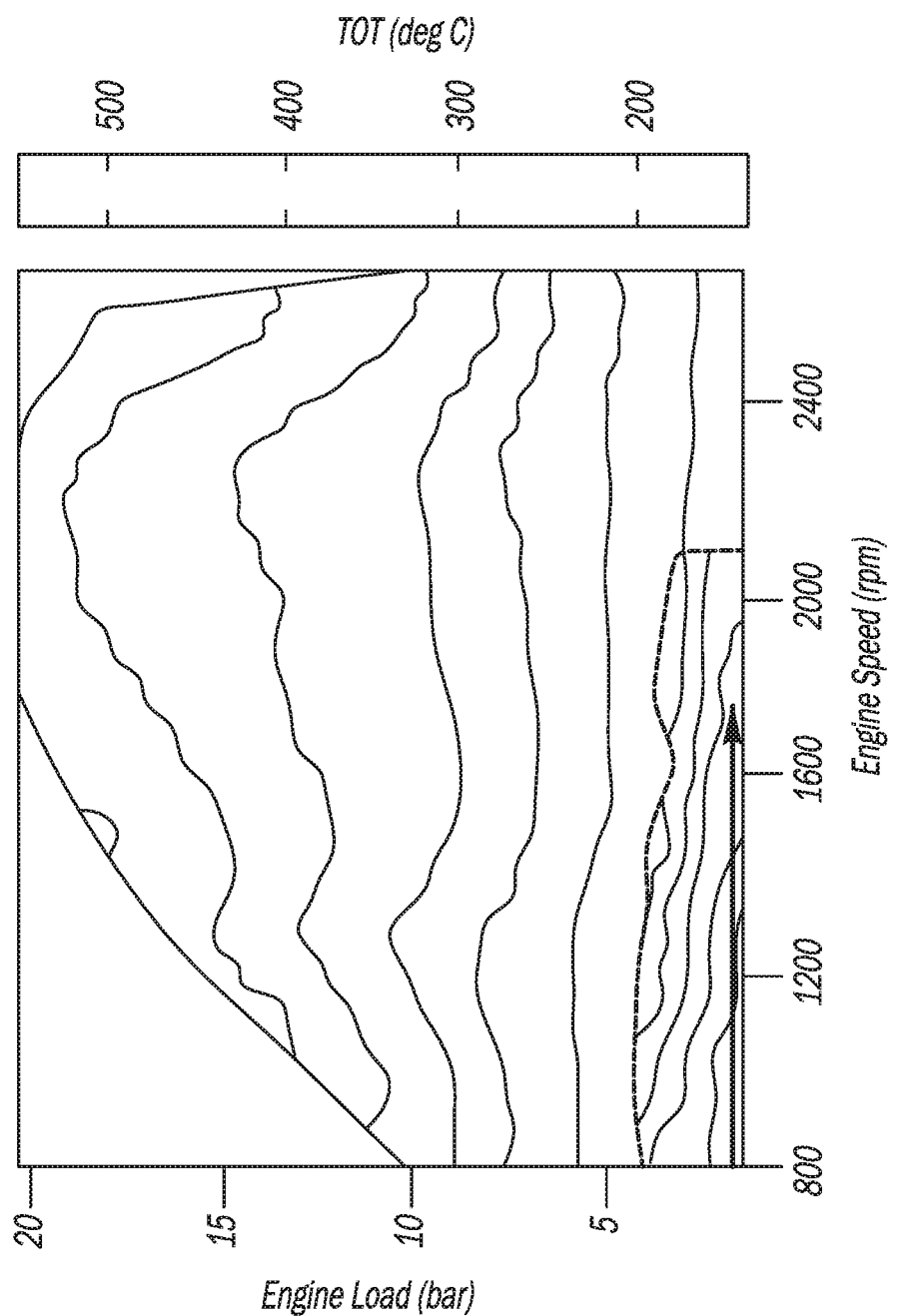
FIG. 13 is a plot of engine load versus engine speed illustrating cylinder deactivation benefits to fast heat up such that the exhaust is hotter and drives more enthalpy to the aftertreatment system.

FIGS. 11 and 12 show a first plot of driveline power, a second plot of engine power (with lower floor) and a third plot of engine power (with continuous addition). FIG. 13 illustrates additional features of the present disclosure. Aftertreatment systems as discussed herein need high temperature to operate efficiently. Running the engine hot is important. Enthalpy to the aftertreatment is also important which is essentially temperature times exhaust flow rate. For fast heat up, the engine can be run at higher speeds (such as 1600 RPM or 2000 RPM for example) in cylinder deactivation mode where the temperature is already very hot. The high engine speed will increase the enthalpy to the catalyst. As shown in FIG. 13, when the engine load is below 3 and 4 brake mean effective pressure (bar or a measurement of engine torque normalized for engine displacement), the aftertreatment system 214 is too cold and is undesirable. However, running the engine in a fast heat up mode, such as in a cylinder deactivation mode (described more fully below) can raise the aftertreatment temperature.

Figure 14A:
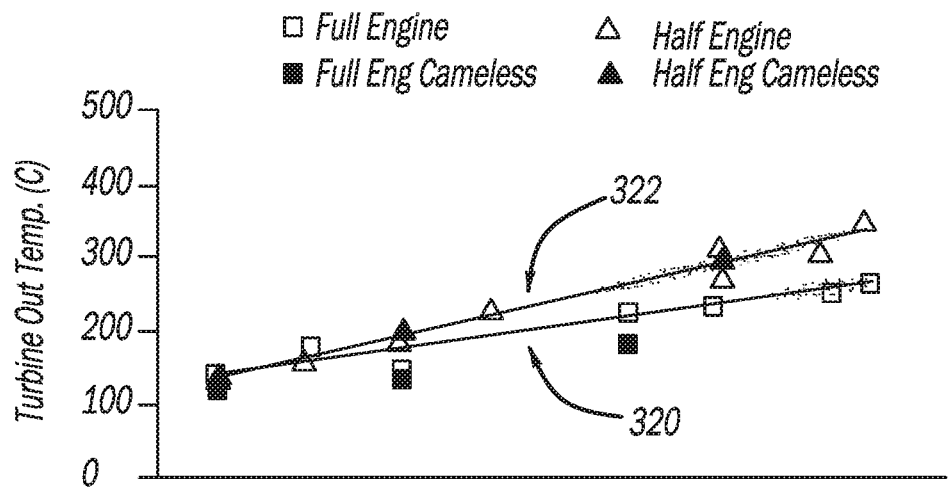
FIGS. 14A and 14B illustrate plots of torque for an engine operating in normal mode and an engine operating in cylinder deactivation mode.
Figure 14B:
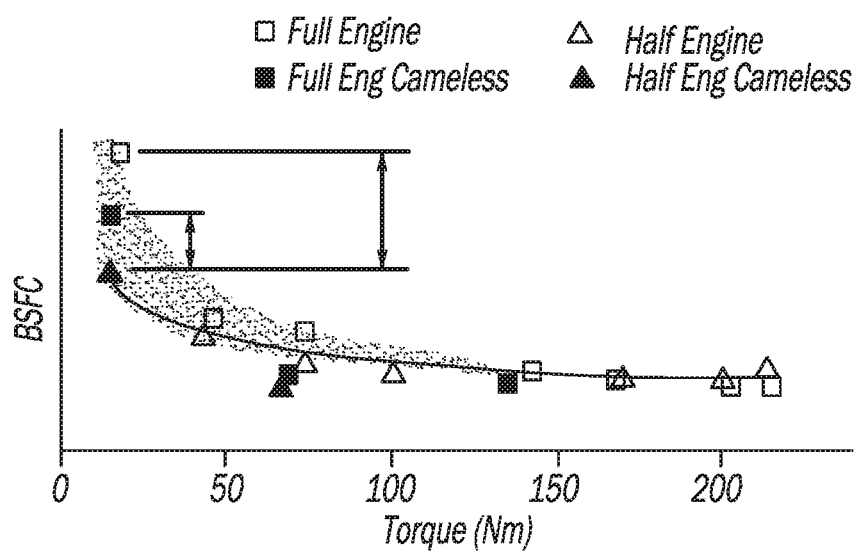

With further reference now to FIGS. 14A and 14B, the present disclosure can operate the engine in cylinder deactivation mode to create higher engine load and therefore elevated aftertreatment temperatures. FIG. 14A shows torque versus turbine outlet temperature. Plot 320 illustrates a temperature of the turbine 222 while in normal, all cylinders firing mode. Plot 322 illustrates a temperature of the turbine 222 while in cylinder deactivation mode. FIG. 14B shows torque versus brake specific fuel consumption (BSFC). As shown, running the engine 12 in cylinder deactivation mode will desirably raise the temperature in the aftertreatment system 214 sooner. Moreover, fuel economy is improved while running in cylinder deactivation which provides a double benefit.

Figure 15:
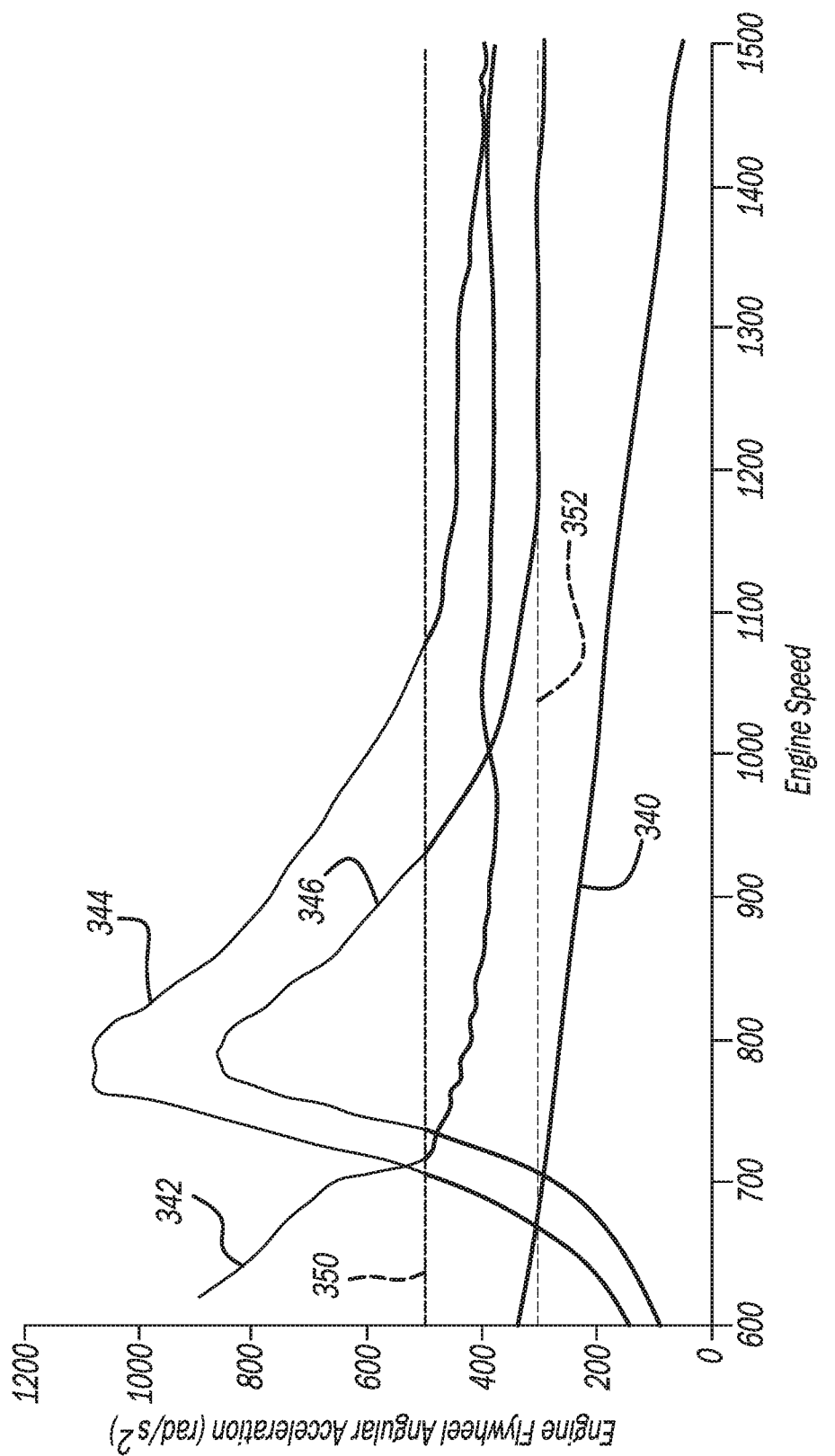
FIG. 15 illustrates engine flywheel angular acceleration (i.e. noise and/or vibration) versus engine speed.

FIG. 15 illustrates engine flywheel angular acceleration (i.e. noise and/or vibration) versus engine speed. Plot 340 shows normal firing of all cylinders (in this example six). Plot 342 shows a first cylinder deactivation mode where three cylinders are firing (three cylinders in CDA). As used herein the term "firing" is used to denote a cylinder that receives fuel and operates to provide power. Plot 344 shows a second cylinder deactivation mode where two cylinders are firing (four cylinders in CDA). Plot 346 shows a third cylinder deactivation mode where four cylinders are firing (two cylinders in CDA).

An acceptable noise and vibration range is identified between lines 350 and 352. As shown, the second and third cylinder deactivation modes (two or four cylinders firing, respectively) are within the acceptable noise and vibration range between 600 and 750 engine RPM. Explained further, during idle speeds, the preferred cylinder deactivation modes are the second (two cylinders firing) and third (four cylinders firing) cylinder deactivation modes. In this regard, these cylinder deactivation modes at startup will influence faster heat up of the aftertreatment, improved fuel economy (versus normal all cylinders firing mode) and be within an acceptable noise vibration range. Moreover, running the engine in the second and third cylinder deactivation modes actually offer improved noise vibration versus an all cylinders firing mode. Of course once engine load reaches between 3 and 4 bar the controller 250 does not need to operate in a cylinder deactivation mode any longer as the aftertreatment system 214 has reached the desired temperature.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A transmission system selectively coupled to an engine crankshaft of an internal combustion engine arranged on a vehicle, the transmission system comprising:
    a transmission having an input shaft, a mainshaft, an output shaft and a countershaft offset from the input shaft, the countershaft drivably connected to the input shaft and the mainshaft;
    a motor generator selectively coupled to the countershaft;
    an aftertreatment system that reduces emissions in an exhaust of the internal combustion engine;
    a controller that operates in an aftertreatment heat-up mode such that the aftertreatment system is heated up to an elevated temperature and emissions are thereby reduced based on the elevated temperature, the controller operating in the aftertreatment heat-up mode when the internal combustion engine is operating at or below a brake mean effective pressure between three and four bar; and
    wherein the aftertreatment heat-up mode comprises increasing load through the transmission and thereby on the internal combustion engine by directing substantially 20 kW to the motor generator during the aftertreatment heat-up mode.

2. The transmission system of claim 1 wherein increasing load further comprises running the engine in cylinder deactivation mode.

3. The transmission system of claim 1 wherein increasing load further comprises running the transmission system in a non-optimized gear ratio.

4. The transmission system of claim 1 wherein increasing load further comprises directing power to a vehicle accessory.

5. The transmission system of claim 1 wherein the motor generator is one of a 12 volt, 24 volt and 48 volt motor.

6. The transmission system of claim 1, further comprising an integrated motor drive and converter that is electrically connected to the motor generator.

7. The transmission system of claim 6 wherein the integrated motor drive and converter includes a three-phase inverter.

8. The transmission system of claim 7, further comprising a first battery electrically coupled to the integrated motor drive and converter, the first battery electrically coupled to vehicle accessories.

9. The transmission system of claim 8 wherein the vehicle accessories comprise at least one of a cooling system, an air compressor, and an electric power steering system.

10. The transmission system of claim 1 wherein the controller directs power to a vehicle accessory in the aftertreatment heat-up mode.

11. The transmission system of claim 1 wherein power is routed through drive wheels during aftertreatment heat-up mode.

12. The transmission system of claim 1 wherein increasing the load further comprises the aftertreatment system heats up to a desired temperature within 400 seconds of engine start.

13. The transmission system of claim 1 wherein increasing the load further comprises the aftertreatment system heats up to a desired temperature within 50 seconds of engine start.

14. A transmission system selectively coupled to an engine crankshaft of an internal combustion engine arranged on a vehicle, the transmission system comprising:
    a transmission having an input shaft, a mainshaft, an output shaft and a countershaft offset from the input shaft, the countershaft drivably connected to the first input shaft and the mainshaft;
    a motor generator selectively coupled to the countershaft;
    an aftertreatment system that reduces emissions in an exhaust of the internal combustion engine; and
    a controller that directs power to the motor generator at startup during an aftertreatment heat-up mode such that the aftertreatment system is heated up to an elevated temperature and emissions are thereby reduced based on the elevated temperature, wherein load is increased through the transmission and thereby on the internal combustion engine during the aftertreatment heat-up mode.

15. The transmission system of claim 14 wherein the controller directs power to a vehicle accessory in the aftertreatment heat-up mode.

16. The transmission system of claim 14 wherein the controller directs substantially 3.5 kW to the motor generator during the aftertreatment heat up mode.

17. The transmission system of claim 14 wherein power is routed through drive wheels during the aftertreatment heat-up mode.

18. The transmission system of claim 14, further comprising a planetary gear set coupled between the countershaft and the motor generator.

19. The transmission system of claim 18, further comprising an integrated motor drive and converter that is electrically connected to the motor generator.

20. The transmission system of claim 19 wherein the integrated motor drive and converter includes a three-phase inverter.

21. The transmission system of claim 20, further comprising a first battery electrically coupled to the integrated motor drive and converter, the first battery electrically coupled to vehicle accessories.

22. The transmission system of claim 21 wherein the vehicle accessories comprise at least one of a cooling system, an air compressor, and an electric power steering system.

23. The transmission system of claim 14 wherein the motor generator is one of a 12 volt, 24 volt and 48 volt motor.

24. The transmission system of claim 14 wherein the internal combustion engine operates between one of a normal operating mode wherein all cylinders are firing and a cylinder deactivation mode wherein less than all cylinders are firing, wherein the controller runs the internal combustion engine at startup in the cylinder deactivation mode to further heat up the aftertreatment system.

25. The transmission system of claim 24 wherein the normal operating mode comprises operating six cylinders and wherein the cylinder deactivation mode comprises firing one of two or four of the six cylinders.

26. A control method for operating an automated manual transmission system in an aftertreatment heat-up mode on a vehicle having a fuel-controlled engine, a multiple-speed change-gear transmission having an input shaft, an output shaft, a countershaft, and a master clutch drivingly interposed between the engine and the input shaft of the transmission, the control method comprising:
  determining vehicle start up;
  routing power from the countershaft to a motor generator; and
  driving the motor generator whereby a load is increased through the transmission from the motor generator and thereby on the internal combustion engine such that an aftertreatment system is heated up to an elevated temperature and emissions are thereby reduced based on the elevated temperature.

27. The control method of claim 26, further comprising charging a vehicle battery while driving the motor generator through an integrated motor drive and converter.

28. The control method of claim 26, further comprising supplying power to a vehicle accessory during the aftertreatment heat-up mode.

29. The control method of claim 26, further comprising:
  operating the engine in a cylinder deactivation mode.

* * * * *